Figure 1:
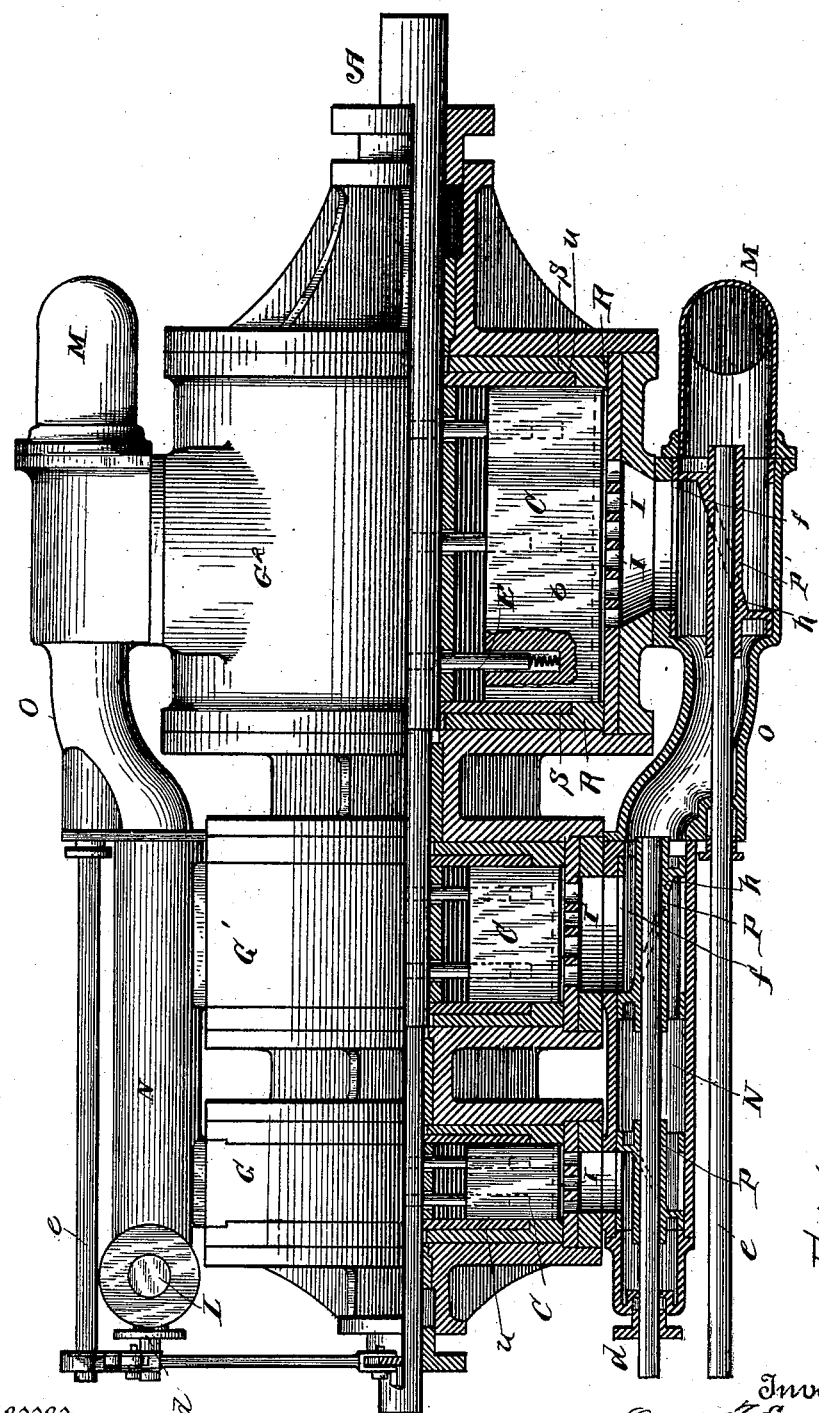

No. 621,555. Patented Mar. 21, 1899.
O. T. EARLE.
ROTARY ENGINE.
(Application filed June 20, 1898.)
(No Model.) 7 Sheets—Sheet 1.

Witnesses
F. C. Barry
C. W. Haskell

Inventor
Oscar T. Earle
per O. E. Duff
Attorney

No. 621,555. Patented Mar. 21, 1899.
O. T. EARLE.
ROTARY ENGINE.
(Application filed June 20, 1898.)
(No Model.) 7 Sheets—Sheet 3.

Witnesses
F. C. Barry
M. M. Haskell

Inventor
Oscar T. Earle
per
O. E. Duffy
Attorney

No. 621,555. Patented Mar. 21, 1899.
O. T. EARLE.
ROTARY ENGINE.
(Application filed June 20, 1898.)

(No Model.) 7 Sheets—Sheet 4.

Witnesses
F. C. Barry
M. W. Haskell

Inventor
Oscar T. Earle
per
O. E. Duff
Attorney

No. 621,555. Patented Mar. 21, 1899.
O. T. EARLE.
ROTARY ENGINE.
(Application filed June 20, 1898.)
(No Model.) 7 Sheets—Sheet 5.

Witnesses
F. C. Barry
M. W. Haskell

Inventor
Oscar T. Earle
per
C. E. Duffy
Attorney

No. 621,555. Patented Mar. 21, 1899.
O. T. EARLE.
ROTARY ENGINE.
(Application filed June 20, 1898.)
(No Model.) 7 Sheets—Sheet 7.

Witnesses
F. C. Barry
M. W. Haskell

Inventor
Oscar T. Earle
per
O. E. Duff
Attorney

UNITED STATES PATENT OFFICE.

OSCAR T. EARLE, OF BALTIMORE, MARYLAND.

ROTARY ENGINE.

SPECIFICATION forming part of Letters Patent No. 621,555, dated March 21, 1899.

Application filed June 20, 1898. Serial No. 683,991. (No model.)

*To all whom it may concern:*

Be it known that I, OSCAR T. EARLE, of Baltimore, in the State of Maryland, have invented certain new and useful Improvements in Rotary Engines; and I do hereby declare that the following is a full, clear, and exact description of the invention, which will enable others skilled in the art to which it appertains to make and use the same, reference being had to the accompanying drawings, and to the letters of reference marked thereon, which form part of this specification.

The object of my invention is to provide a simple and efficient rotary engine of the compound type—that is to say, of the type in which the steam is used successively and expansively in a series of cylinders which increase in capacity. I mount end to end on a shaft a series of concentric drums, each having radially-movable blades or pistons arranged to travel around the interior of an eccentric cylinder. The cylinders are arranged end to end on the shaft, to which they are set eccentrically, their centers being located at different distances and in different directions from the axis of rotation in order to save clearance and economize space, and are connected by passages made up of inclosed spaces and valve-chambers upon each side of the cylinders, said valve-chambers being provided with ports and reversing-valves opposite each cylinder, whereby the engine can be reversed at will.

My engine, as shown, is adapted for a triple-expansion engine; but it will be readily seen that by removing or adding a cylinder the engine may be altered into a simple or quadruple expansion engine and that this may be done (indefinitely limited only by the steam-pressure carried) without departing from the spirit of my invention.

Figure 2:
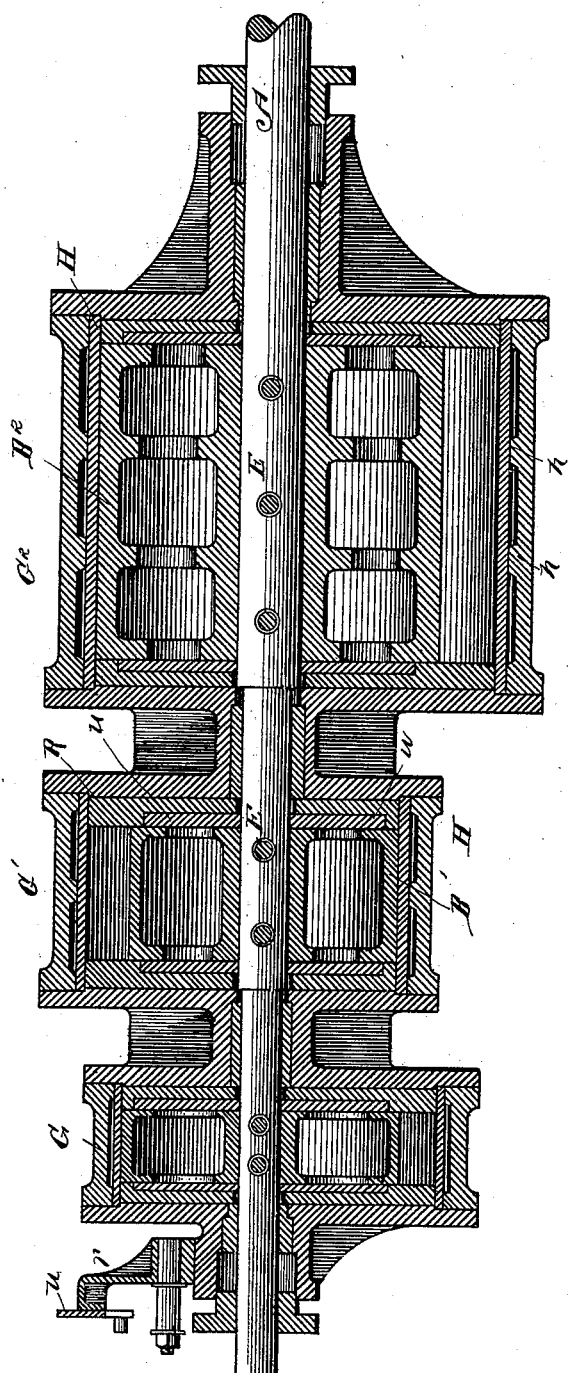
Figure 3:
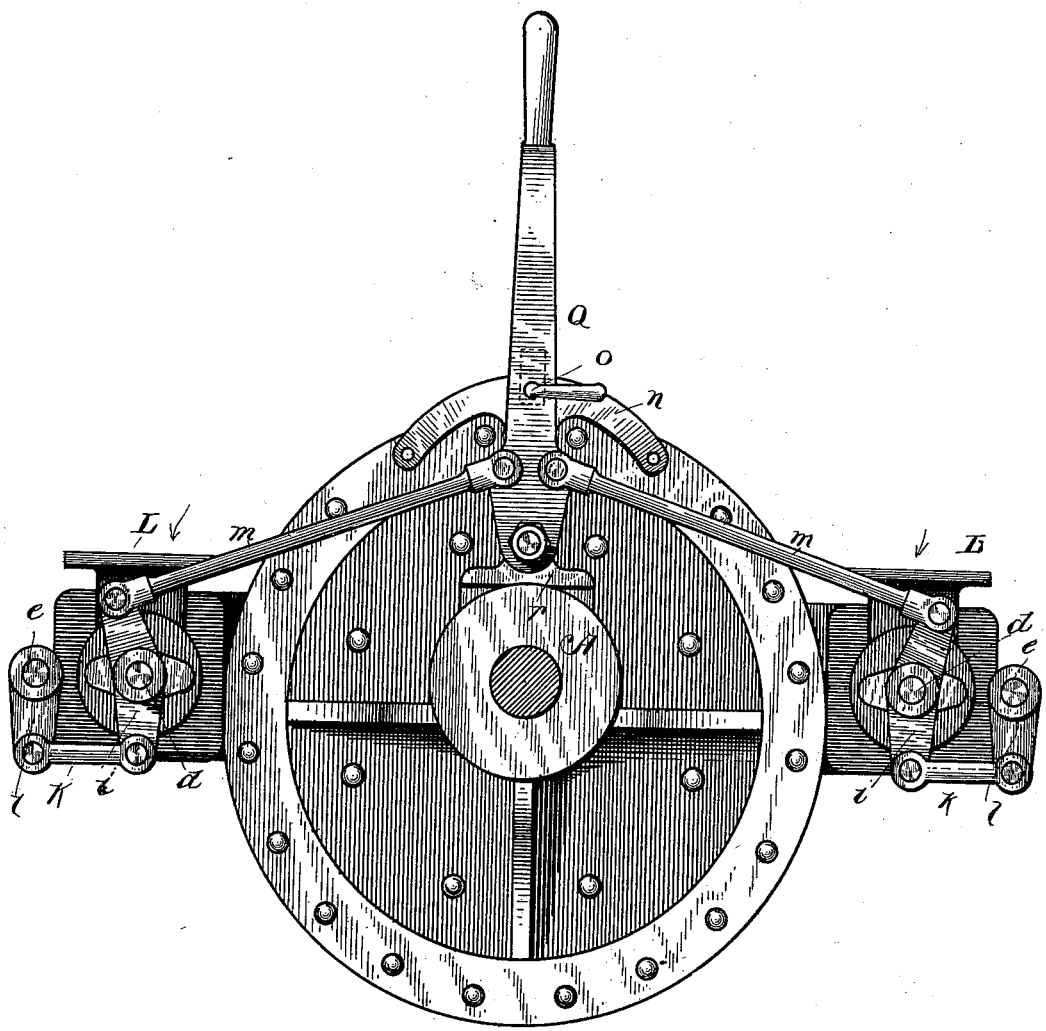
Figure 4:
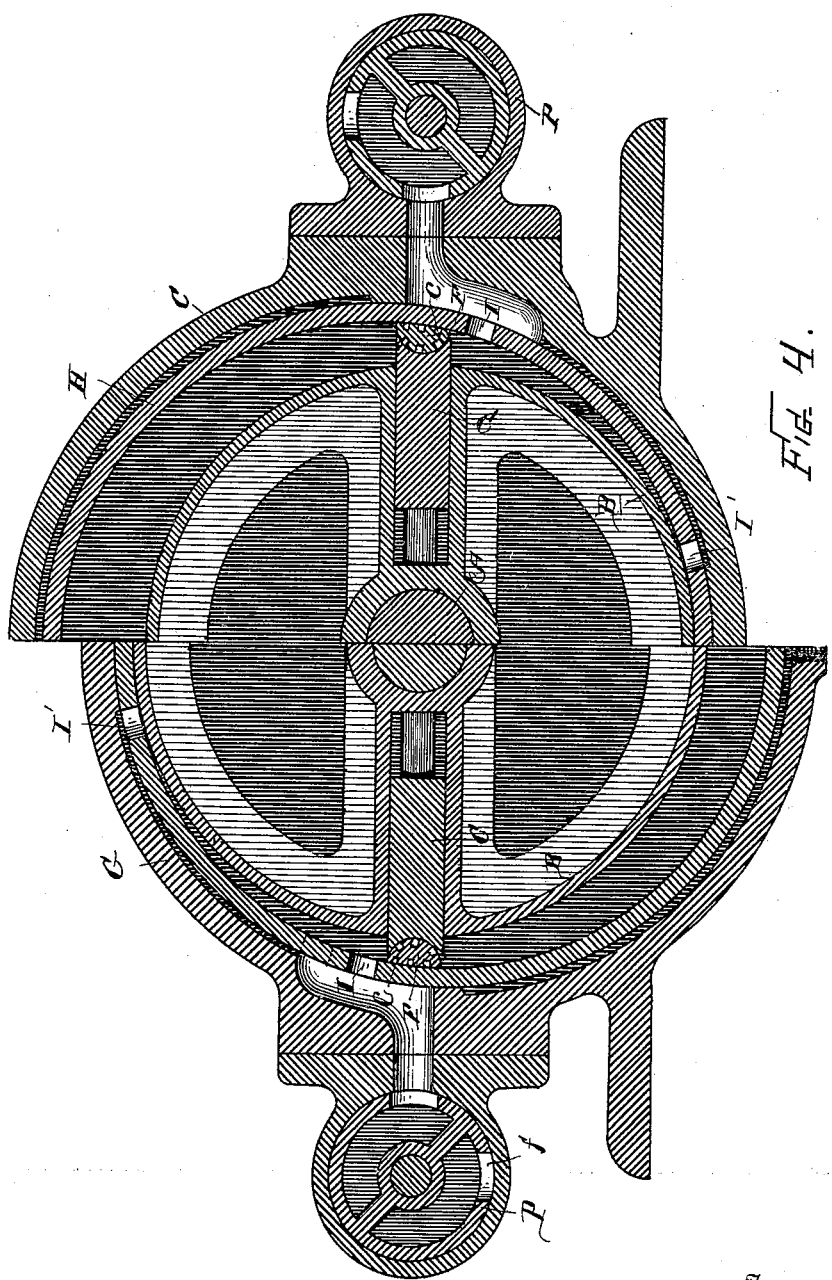
Figure 5:
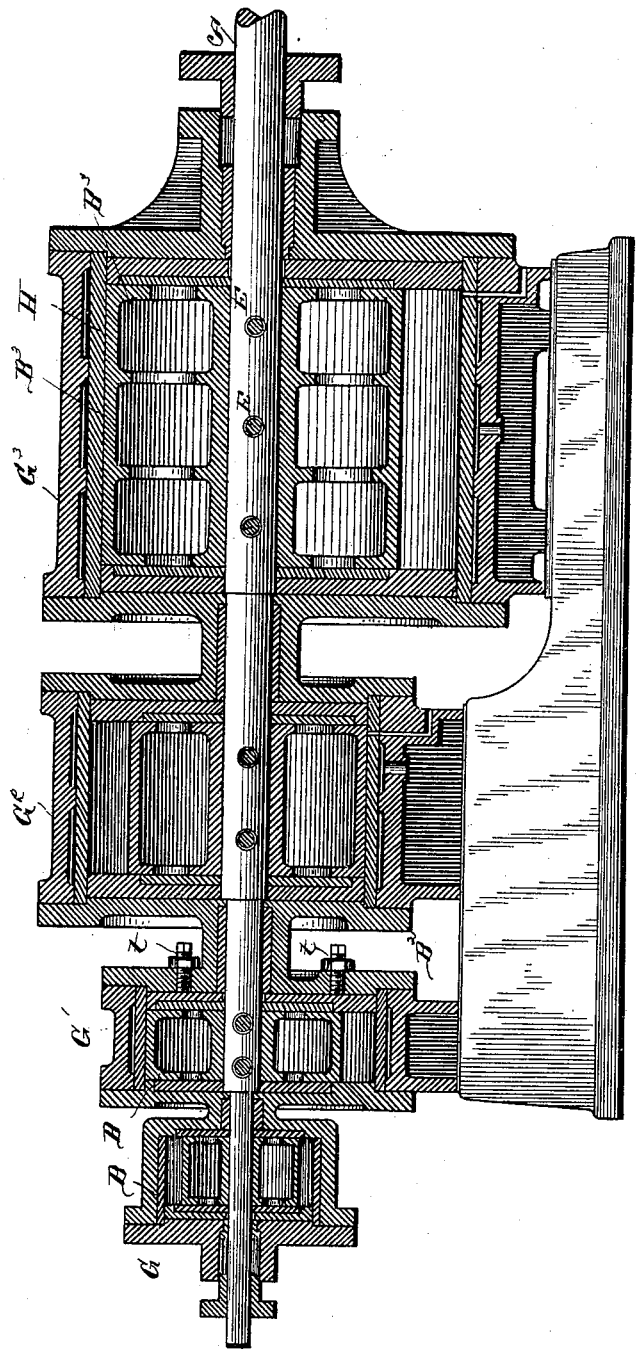
Figure 6:
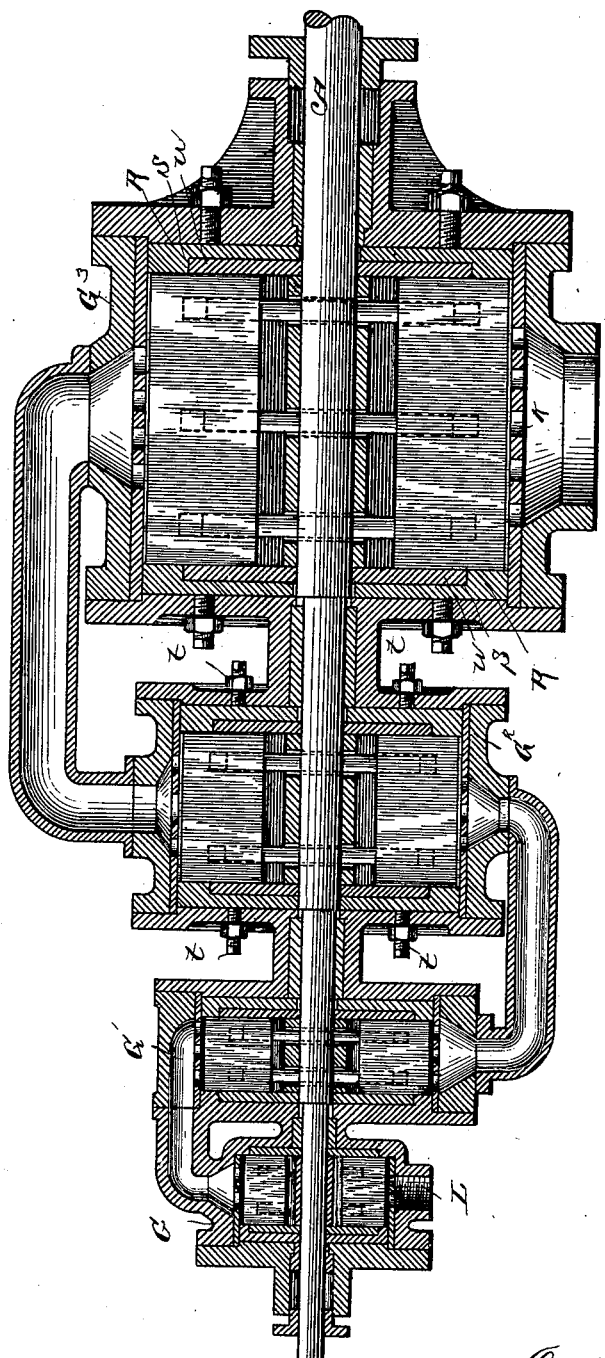
Figure 7:
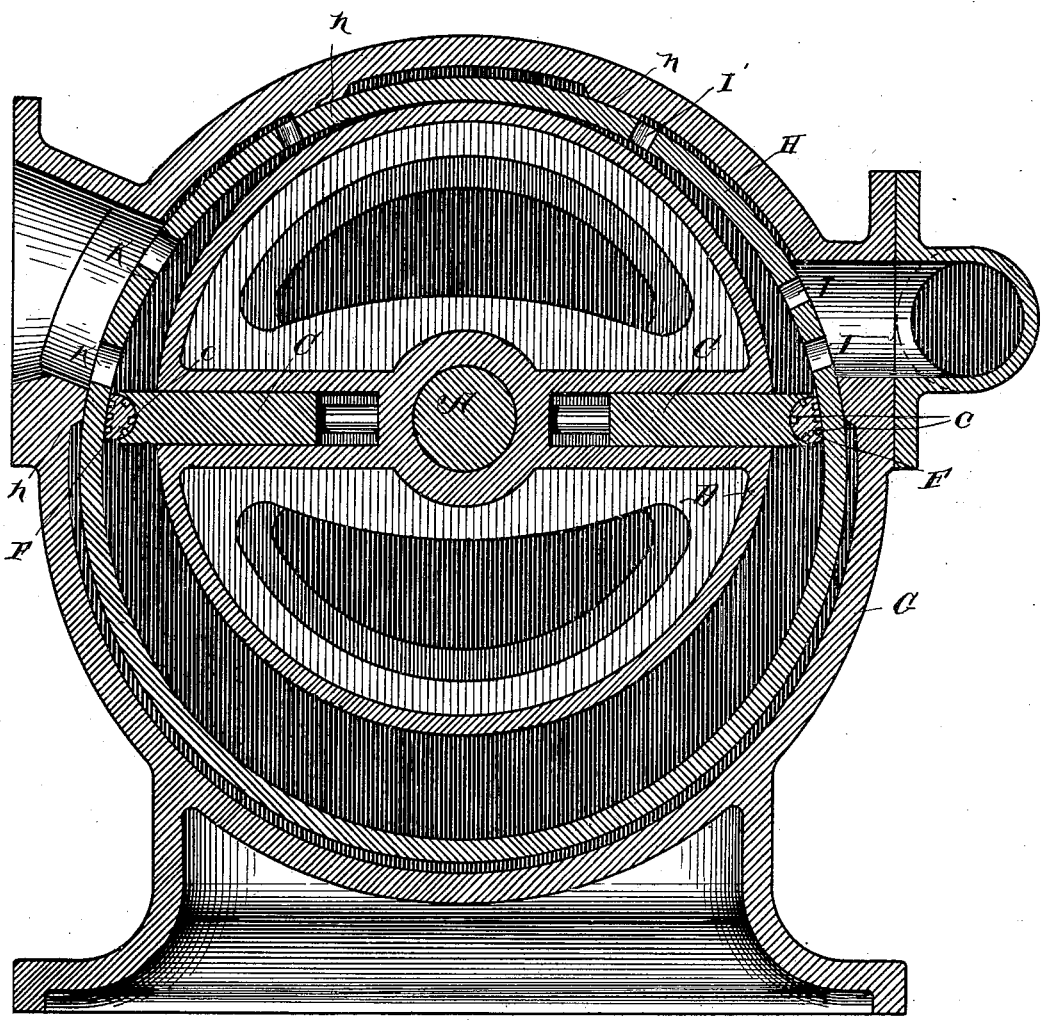

In the accompanying drawings, Figure 1 is a longitudinal view, partly in section, showing the ports and arrangement of the reversing-valves on one side of the cylinders. Fig. 2 is a longitudinal horizontal section through the engine, showing the arrangement of cylinders or engines on the shaft. Fig. 3 is an end view of the engine, showing the mechanism for reversing or stopping the engine. Fig. 4 is a half-vertical section of two adjoining cylinders. Figs. 5 and 6 are longitudinal sections of a non-reversible engine of the same type in which there is no necessity for the reversing-valves and in which an additional cylinder has been added, making a quadruple-expansion engine. Fig. 7 is a transverse section through one of the cylinders, all of which are alike.

Referring to the drawings, A represents the main shaft, upon which are placed concentrically the drums B B' B² for each cylinder. The shaft is increased in diameter in each cylinder, starting from the high-pressure cylinder, so as to secure a light shaft having the proper strength to transmit the power. The shaft and concentric drums are placed eccentrically in the cylinders, the drums touching the cylinder-linings at one point.

C C' C² are the pistons which are carried in each drum, one on each side in a recess, which permits them to adjust themselves to keep their outer ends in contact with the cylinder, and are provided with adjustable semicircular grooved packing-strips which are shaped to conform to the inner surface of the cylinder, the grooves holding lubricants.

E E are spacing and guide rods which extend through the shaft and into recesses $a$ $a$ in the pistons. To compensate for variations in the length between the ends of the pistons as they alternately occupy the true or eccentric diameters of the cylinders, springs $b$ $b$ are placed in the recesses between the rods and the pistons, keeping the packing-strips carried by the pistons in yielding contact with the cylinders.

F F are the adjustable semicircular packing-strips for the outer ends of the pistons, the inner faces being cylindrical and fitting in corresponding grooves in the ends of the pistons, the outer faces having a curve conforming to the contour of the cylinder, as seen in Fig. 7. These adjustable strips are provided on both faces with minute longitudinal grooves $c$ $c$, which carry lubricants and prevent the steam from escaping either above or below the adjustable packing-strip.

It will be seen that the rolling adjustment permitted by the form of the packing-strip will keep its outer face always parallel with the inner face of the cylinder-lining, with which it will be in yielding contact.

G G G² are the cylinders, and H H H are the cylinder-linings. The linings are placed in the cylinders on legs $h\ h$, formed on the cylinders, which form an air-space between them, and thereby prevent condensation of steam in the cylinders.

I I I' are the inlet or exhaust ports, as the case may be, through the cylinder-linings, depending upon the position of the valves, whether set for running the engine to right or left. In Fig. 7 they are the inlet-ports and K K the exhaust, since this shows the last cylinder in the non-reversible engine. Fig. 4 shows the ports in a reversible engine.

It will be seen ports I, I, and I' are some distance apart. This is so arranged that the pressure is equal upon both sides of the pistons, permitting them to move freely while in the smallest area of the cylinders and preventing all compression.

L L are the steam-pipes and M M the exhaust-pipes on each side of the engine, only one of each being employed at a time. Leading from the steam-pipes L L on each side of the two first cylinders of the engine are the steam or exhaust pipes N N, to which is attached the offset pipe O O, leading to or from the last cylinder. Each of the pipes N N contains the reversing-valves P P for the two first cylinders, while the pipes O O contain each a reversing-valve P' for the last cylinder.

The valves P P are connected together and operated by the rods $d\ d$, while the valves P' are each operated by the rods $e\ e$, which lead out through the offset pipes O O and are there, like the rods $d$, provided with the ordinary stuffing-box. The valves are cylinders having ports $f\ f$ cut through their sides at the proper distance apart and are divided by a diaphragm $h\ h$ and will be inlet or exhaust valves according to the position in which they are set.

$g\ g\ g$ are ports leading to or from the cylinders controlled by the reversing-valves.

To the outer ends of the rods $d\ d$ are secured the levers $i\ i$, the lower arms of which are connected to the arms $l\ l$ on the rods $e\ e$ by the links $k$. The upper arms of the levers $i\ i$ are connected to the reversing-lever Q by the rods $m\ m$, which are pivoted to the bracket $r$ on the cylinder-head.

N is the usual quadrant for securing the lever Q after adjustment by means of an ordinary clamp $o$.

It will be seen that any movement of the lever Q will correspondingly move all the valves, and in the position as now shown in Fig. 4 all the ports are closed, but by moving the lever to the right or left the ports will register with the cylinder-ports and the engine will move in the desired direction.

In Figs. 1 and 4 the valves are set to take steam in the right of the first cylinder, exhausting into the left of the second cylinder, which exhausts it into right of third cylinder, from which it is finally exhausted on the opposite side. It will be understood that the valves on the left of the engine are set reverse to those shown on the right hand, and that, therefore, the first steam-inlet is shut and final exhaust is open on that side.

Within the cylinder H and next to its heads are placed the inner heads R R. These heads are recessed at $s$ for the disks $u$ at the ends of the drums. These heads and disks form a packing for the drums, one or both of which can be set up or adjusted to compensate for wear by the set-screws $t\ t$, as shown in Figs. 5 and 6.

Figs. 5 and 6 show a quadruple-expansion engine which is in every respect, except the valve and gearing, the same as the triple-expansion engine heretofore described. The difference consists in that the reversing-valves have been omitted; but the course of the steam is the same for running the engine in one direction—that is, the steam passes through the cylinders successively in alternate directions until it is finally exhausted.

Having thus described my invention, what I claim is—

1. In a compound rotary engine the combination of a series of three cylinders with a corresponding series of reversing-valves, rods connected to and operating two of the valves, separate rods for operating the remaining valve on each side, links for connecting the two rods on each side, and rods for connecting the reversing-lever with one of the valve-rods on each side of the engine whereby all the valves are operated simultaneously.

2. In a compound rotary engine the combination of the cylinder, the cylinder-lining, the drum, the disk forming a packing against the end of the drum, the inner cylinder-head formed with a recess for the disk and means for setting up the inner head and disk.

3. In a rotary engine the combination of the cylinder, the drum carrying the pistons, the adjustable semicircular strip on the end of the piston, and the adjustable packing-disk on both sides of the piston and packing-strip, substantially as shown and described.

4. In a rotary engine the combination of a cylinder, a drum provided with pistons fitted to move easily in recesses in the drum, rods passing through the shaft into recesses in the pistons, springs between the rods and pistons, and adjustable semicircular grooved packing-strips at the end of the pistons, with an adjustable disk at each end of the drum.

5. In a compound rotary engine the combination of a series of cylinders with a series of reversing-valves on each side of the cylinders, each valve provided with a diaphragm and a port each side of the diaphragm and ports in the seat registering with either port in the valve.

In testimony that I claim the foregoing as my own I affix my signature in presence of two witnesses.

OSCAR T. EARLE.

Witnesses:
 O. E. DUFFY,
 HERBERT C. EMERY.